US012749399B2

(12) United States Patent
Kashiwakura et al.

(10) Patent No.: US 12,749,399 B2
(45) Date of Patent: Sep. 29, 2026

(54) ROADSIDE DEVICE

(71) Applicant: TOYOTA JIDOSHA KABUSHIKI KAISHA, Toyota (JP)

(72) Inventors: Toshiki Kashiwakura, Tokyo (JP); Chihiro Inaba, Tokyo (JP); Shoi Suzuki, Tokyo (JP); Tsuyoshi Okada, Nagoya (JP); Yasuhiro Kobatake, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 77 days.

(21) Appl. No.: 18/908,794

(22) Filed: Oct. 8, 2024

(65) Prior Publication Data

US 2025/0218293 A1 Jul. 3, 2025

(30) Foreign Application Priority Data

Dec. 28, 2023 (JP) ................................ 2023-223079

(51) Int. Cl.
*G08G 1/005* (2006.01)
*G08G 1/095* (2006.01)
(Continued)

(52) U.S. Cl.
CPC ....... *G08G 1/096783* (2013.01); *G08G 1/005* (2013.01); *G08G 1/095* (2013.01); *H04W 4/44* (2018.02)

(58) Field of Classification Search
CPC .. G08G 1/096783; G08G 1/164; G08G 1/005; G08G 1/095; G08G 1/16; G08G 1/167; G08G 1/00; G08G 3/00; G08G 5/00; G08G 7/00; G08G 9/00; G08G 99/00; B60W 2050/146; B60W 50/14; B60W 2040/0818; B60W 2050/0083; B60W 2050/143; B60W 2510/244; B60W 2540/215; B60W 2540/221; B60W 2540/229; B60W 2554/406; B60W 2556/45; B60W 40/04; B60W 40/08; B60W 60/00133; B60W 30/14; B60W 30/18163; B60W 60/00; G07C 5/008; G07C 5/0808; G07C 5/08; G07C 5/0816; G07C 5/085; B60K 2360/172; B60K 2360/175; B60K 2360/178; B60K 2360/1876; B60K 2360/741; B60K 35/22; B60K 35/25;
(Continued)

(56) References Cited

U.S. PATENT DOCUMENTS

| | | | | |
|---|---|---|---|---|
| 2009/0224942 | A1* | 9/2009 | Goudy .................. | G08G 1/164 340/905 |
| 2009/0224952 | A1* | 9/2009 | Funabashi ............. | H04N 5/185 341/142 |

(Continued)

FOREIGN PATENT DOCUMENTS

| | | | |
|---|---|---|---|
| JP | 2023-050629 | A | 4/2023 |
| JP | 2023-180614 | A | 12/2023 |

*Primary Examiner* — Daniel Previl
(74) *Attorney, Agent, or Firm* — SoraIP, Inc.

(57) ABSTRACT

The disclosure relates to a roadside device and a method for providing mobility-as-a-service. The roadside device includes a notification unit and a control unit. The control unit determines an operating state of the roadside device, and performs a notification process to the notification target person according to the determined operating state.

16 Claims, 5 Drawing Sheets

(51) Int. Cl.
*G08G 1/0967* (2006.01)
*H04W 4/44* (2018.01)

(58) Field of Classification Search
CPC ........ B60K 35/26; B60K 35/28; B60K 35/29; B60K 35/654; B60K 35/81; B60R 16/023; B60R 25/102; G01C 21/3415; G01C 21/3691; G06F 13/00; G06F 3/011; G06F 3/167; G06F 2203/013; G06F 2203/0382; G06F 2203/0383; G06F 2203/0384; G06F 3/016; G06F 3/0325; G06F 3/038; G06F 3/0383; G06F 3/0487; G06F 3/017; G06F 2203/011; G06F 3/0346; G06F 3/04883; G06F 2209/509; G06F 9/5016; G06F 9/5038; G06F 9/5066; G06F 16/25; G06F 16/583; G06F 16/951; G06F 21/00; G06F 2203/012; G06F 2203/04806; G06F 2203/04808; G06F 3/013; G06F 3/0304; G06F 3/04845; G06F 3/04847; G06F 40/205; G06V 20/597; G06V 20/58; G06V 10/00; G06V 20/00; G06V 30/00; G06V 40/00; G06V 2201/00; H04L 12/28; H04L 63/0227; H04L 63/062; H04L 63/123; H04L 63/1416; H04L 63/1441; H04L 12/1822; H04L 65/1069; H04L 65/403; H04L 12/1827; H04L 65/1089; H04L 12/1818; H04L 12/1831; H04L 65/1093; H04L 65/4015; H04W 4/40; H04W 4/44; G01M 17/007; G01S 17/931; G01S 1/00; G01S 3/00; G01S 5/00; G01S 7/00; G01S 11/00; G01S 13/00; G01S 15/00; G01S 17/00; G01S 19/00; G01S 2201/00; G01S 2205/00; G05D 1/0011; G05D 1/0274; G05D 1/246; G05D 1/0044; G05D 1/0272; G05D 1/0253; G05D 1/2437; G05D 1/0219; G05D 1/0248; G05D 1/242; G05D 1/249; G05D 1/617; G05D 1/622; G05D 2105/10; G05D 2109/10; G05D 2111/17; G05D 2111/54; G05D 1/0238; G05D 1/0242; G05D 1/43; G05D 2111/14; G05D 1/0016; G05D 1/0022; G05D 1/024; G05D 1/027; G05D 1/2435; G05D 1/245; G05D 1/2464; G05D 1/644; G05D 1/6485; G05D 1/661; G05D 2105/87; G05D 1/0214; G05D 1/0246; G05D 1/243; G05D 1/6484; G05D 2101/20; G05D 2107/40; G05D 2111/10; G06Q 10/20; G06Q 10/00; G06Q 20/00; G06Q 30/00; G06Q 40/00; G06Q 50/00; G06Q 90/00; G06Q 99/00; G06Q 2220/00; G06Q 2230/00; G06Q 2240/00; G06Q 2250/00; G06Q 10/103; G06Q 30/012; G06Q 30/0265; G06Q 30/0639; G06Q 50/40; A63F 13/213; A63F 13/211; A63F 13/215; A63F 13/235; A63F 13/26; A63F 13/285; A63F 13/323; A63F 13/428; A63F 13/44; A63F 13/71; A63F 13/79; A63F 13/798; A63F 13/338; A47L 11/4011; A47L 11/4061; A47L 2201/022; A47L 2201/024; A47L 2201/04; A47L 11/4013; A47L 11/4063; A47L 2201/028; A47L 2201/06; A47L 9/0477; A47L 9/28; A47L 9/2826; A47L 9/2847; A47L 9/2852; A47L 9/2857; A47L 9/2873; A47L 9/2894; A47L 9/30; A47L 11/4008; A47L 11/4025; A47L 11/4041; A47L 11/4088; A47L 11/4091; A47L 2201/026; A47L 2201/02
USPC ....... 340/905, 901, 907, 908, 925, 929, 918, 340/919, 931, 953, 964, 870.09, 438, 439
See application file for complete search history.

(56) References Cited

U.S. PATENT DOCUMENTS

| | | | | |
|---|---|---|---|---|
| 2019/0096230 | A1* | 3/2019 | Tanabe | H04W 4/90 |
| 2020/0410788 | A1* | 12/2020 | Uchiyama | G01M 17/007 |
| 2023/0401841 | A1 | 12/2023 | Ishikawa et al. | |
| 2024/0064169 | A1* | 2/2024 | Kishikawa | B60R 16/023 |
| 2024/0253658 | A1* | 8/2024 | Kume | B60W 40/08 |

* cited by examiner

ROADSIDE DEVICE

CROSS-REFERENCE TO RELATED APPLICATION

This application claims priority to Japanese Patent Application No. 2023-223079 filed on Dec. 28, 2023, incorporated herein by reference in its entirety.

BACKGROUND

1. Technical Field

The present disclosure relates to roadside devices.

2. Description of Related Art

Conventionally, a technique for monitoring a vehicle with a communication function is known in the art. Japanese Unexamined Patent Application Publication No. 2023-050629 (JP 2023-050629 A) discloses a notification system that notifies pedestrians or vehicles other than an autonomous vehicle that is going to pass through a predetermined traffic area of whether the pedestrians or the vehicles can proceed, or alerts the pedestrians or the vehicles, according to the behavior of the autonomous vehicle.

SUMMARY

Improvement is desired in technique related to a roadside device that can be used to monitor a vehicle with a communication function.

In view of such circumstances, an object of the present disclosure is to improve a technique related to a roadside device that can be used to monitor a vehicle with a communication function.

A roadside device according to an embodiment of the present disclosure includes: a notification unit; and a control unit.

The control unit is configured to determine an operating state of the roadside device, and perform a notification process for notifying a notification target person according to the determined operating state.

According to the embodiment of the present disclosure, the technique related to a roadside device that can be used to monitor a vehicle with a communication function can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the accompanying drawings.

Figure 1:
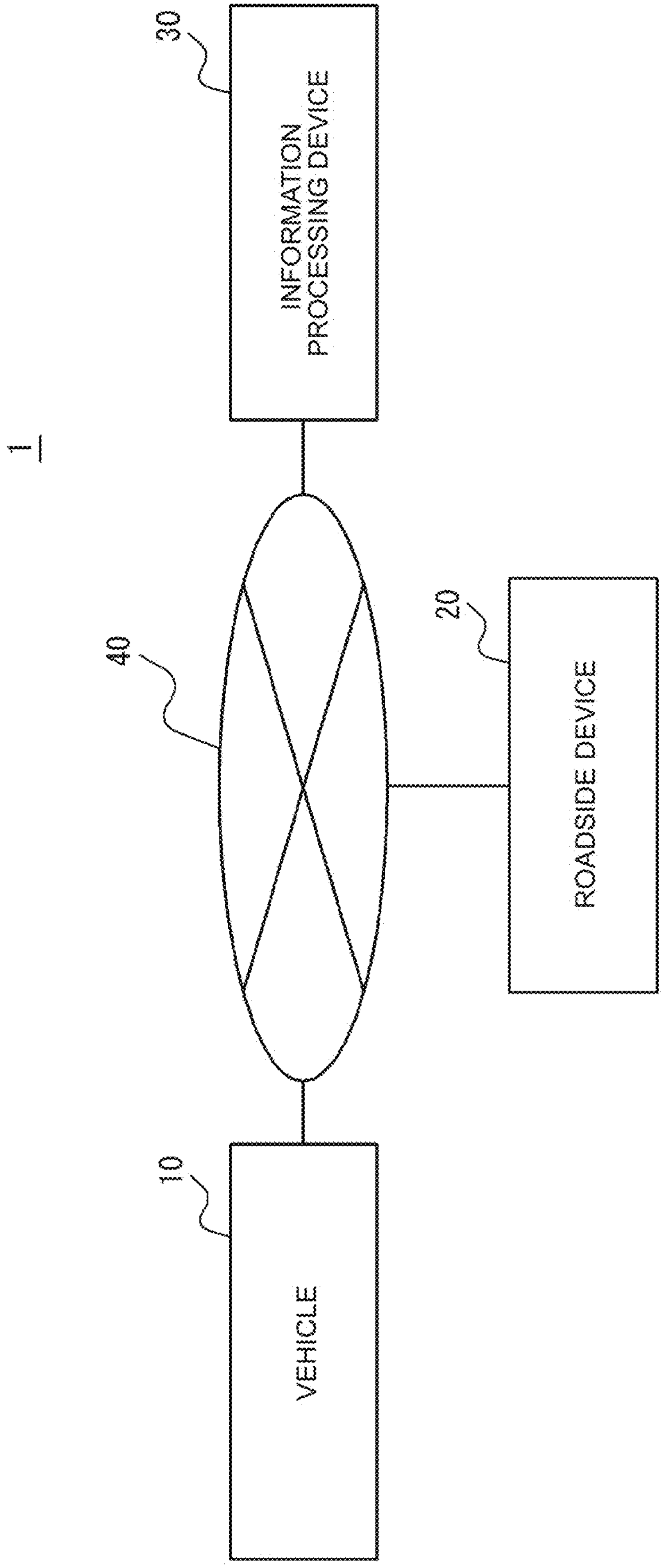
FIG. 1 is a configuration diagram schematically illustrating an example of a configuration of an information processing system according to an embodiment of the present disclosure.

FIG. 1 is a configuration diagram schematically illustrating an example of a configuration of an information processing system 1 according to an embodiment of the present disclosure. The information processing system 1 includes a vehicle 10, a roadside device 20, and an information processing device 30. The vehicle 10, the roadside device 20, and the information processing device 30 are communicably connected to a network 40 including, for example, a mobile communication network and the Internet.

Vehicles 10 include gasoline-powered vehicles, battery electric vehicle (BEV; Battery Electric Vehicle), hybrid electric vehicle (HEV; Hybrid Electric Vehicle), plug-in hybrid electric vehicle (PHEV; Plug-in Hybrid Electric Vehicle), and fuel cell electric vehicle (FCEV; Fuel Cell Electric Vehicle). The vehicle 10 is not limited thereto. Vehicle 10 may include any other vehicle capable of being ridden by a human.

The vehicle 10 may include an autonomous vehicle capable of autonomous driving, for example, the levels 1 to 5 defined in Society of Automotive Engineers (SAE). For example, the vehicle 10 is capable of autonomous driving at level 3 or 4, and the driver can override the driving operation while the driver is riding the vehicle 10 or remotely. The information processing system 1 may include any number of vehicles 10, namely may include one or more vehicles 10.

The roadside device 20 is installed, for example, in the vicinity of an intersection or a crosswalk. The roadside device 20 can detect a pedestrian who intends to cross a roadway based on an image of a camera mounted on the roadside device 20 itself. In the roadside device 20, for example, a detection area is set in advance around the own device. When the roadside device 20 detects a pedestrian who intends to cross the roadway, it notifies the pedestrian of the presence or absence of the vehicle 10 (for example, the vehicle 10 approaching the own vehicle) that has entered the detection area of the own vehicle. When the roadside device 20 detects a pedestrian attempting to cross a roadway, it notifies the driver or the driver assistant of the vehicle 10 that has entered the detection area of the own vehicle of the presence of the pedestrian. The information processing system 1 may include any number of roadside devices 20, namely may include one or more roadside devices 20.

The information processing device 30 includes any general-purpose electronic device such as a Personal Computer (PC), a tablet PC, a smart phone, and a smart watch, which is used by a notification target person to be described later. Without being limited thereto, the information processing device 30 may include one server device or a plurality of server devices that can communicate with each other, or may include other electronic devices dedicated to the information processing system 1. The information processing system 1 may include any number of information processing devices 30, namely one or more information processing devices 30.

Figure 2:
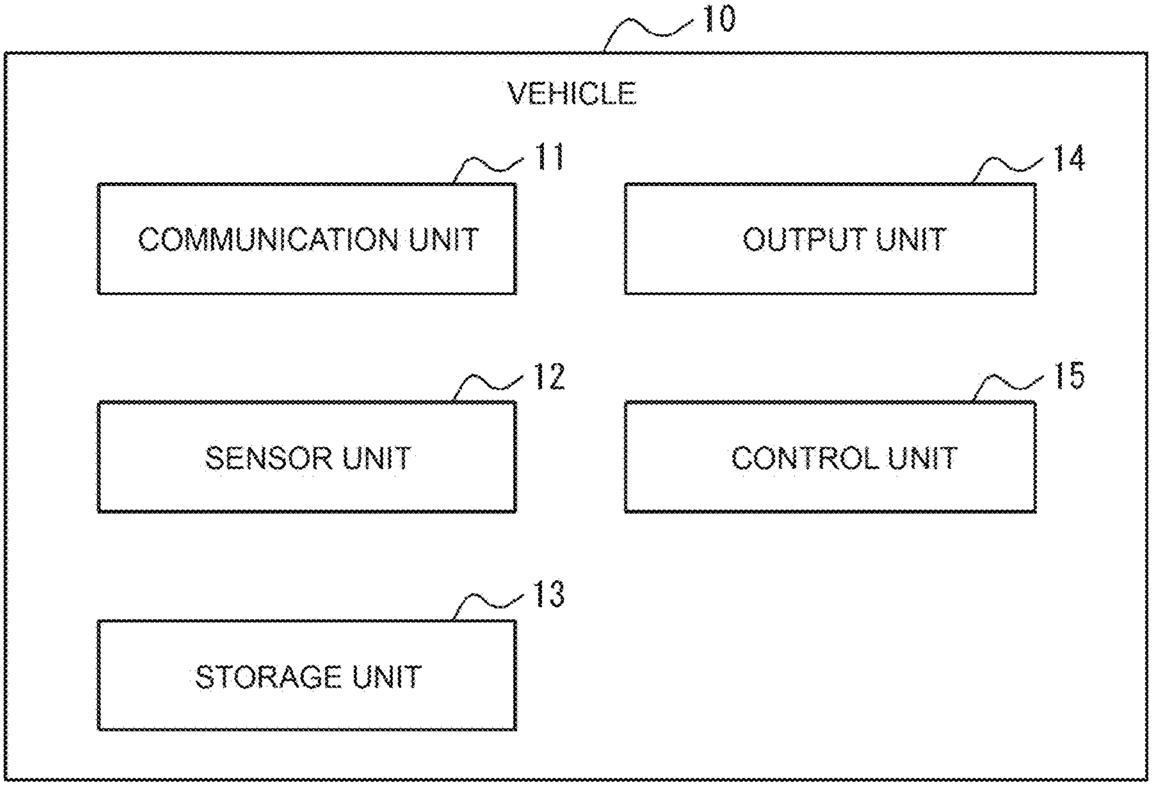
FIG. 2 is a block diagram illustrating an example of a configuration of the vehicle of FIG. 1.

FIG. 2 is a block diagram illustrating an example of a configuration of the vehicle 10 of FIG. 1. The vehicle 10 includes a communication unit 11, a sensor unit 12, a storage unit 13, an output unit 14, and a control unit 15.

The communication unit 11 includes one or more communication interfaces connected to the network 40. The communication interfaces correspond to mobile communication standards such as 4G (4th Generation) and 5G (5th Generation) or radio Local Area Network (LAN). The communication interface is not limited thereto. The communication interface may correspond to any other communication standard.

The sensor unit 12 includes one or more sensors used to control the vehicle 10. The sensors include position sensors, geomagnetic sensors, velocity sensors, accelerometers, gyroscopic sensors, and the like corresponding to, for example, Global Positioning System (GPS). The sensor is not limited thereto. The sensor may include any other sensor.

The storage unit 13 includes one or more memories. In the present disclosure, the "memory" is, for example, a semiconductor memory, a magnetic memory, an optical memory, or the like, but is not limited thereto. Each memory included in the storage unit 13 may function as, for example, a main storage device, an auxiliary storage device, or a cache memory. The storage unit 13 stores arbitrary information which is used for operation of the vehicle 10. For example, the storage unit 13 may store a system program, an application program, embedded software, and the like. For example, information stored in the storage unit 13 may be updated with information which is acquired from the network 40 via the communication unit 11.

The output unit 14 includes one or more output devices that output information to an occupant, including a driver or a driver assistant, in the vehicle cabin of the vehicle 10. The output device includes a display that visually outputs information in an image, a speaker that audibly outputs information in a sound, and a vibrator that vibrates and tactilely outputs information. As used herein, "display" includes, for example, Liquid Crystal Display (LCD) and organic Electro Luminescent (EL) displays, and the like. The output device may constitute a part of a car navigation device.

The control unit 15 includes one or more processors, one or more programmable circuits, one or more dedicated circuits, or a combination thereof. A "processor" as used herein is a general-purpose processor, such as, for example, Central Processing Unit (CPU) or Graphics Processing Unit (GPU), or a special-purpose processor specialized for a particular process. The processor is not limited thereto. "Programmable circuitry" is for example, but not limited to, Field-Programmable Gate Array (FPGA). "Dedicated circuitry" is for example, but not limited to, Application-Specific Integrated Circuit (ASIC). The control unit 15 is communicably connected to the respective constituent units constituting the vehicle 10, and controls the overall operation of the vehicle 10.

Figure 3:
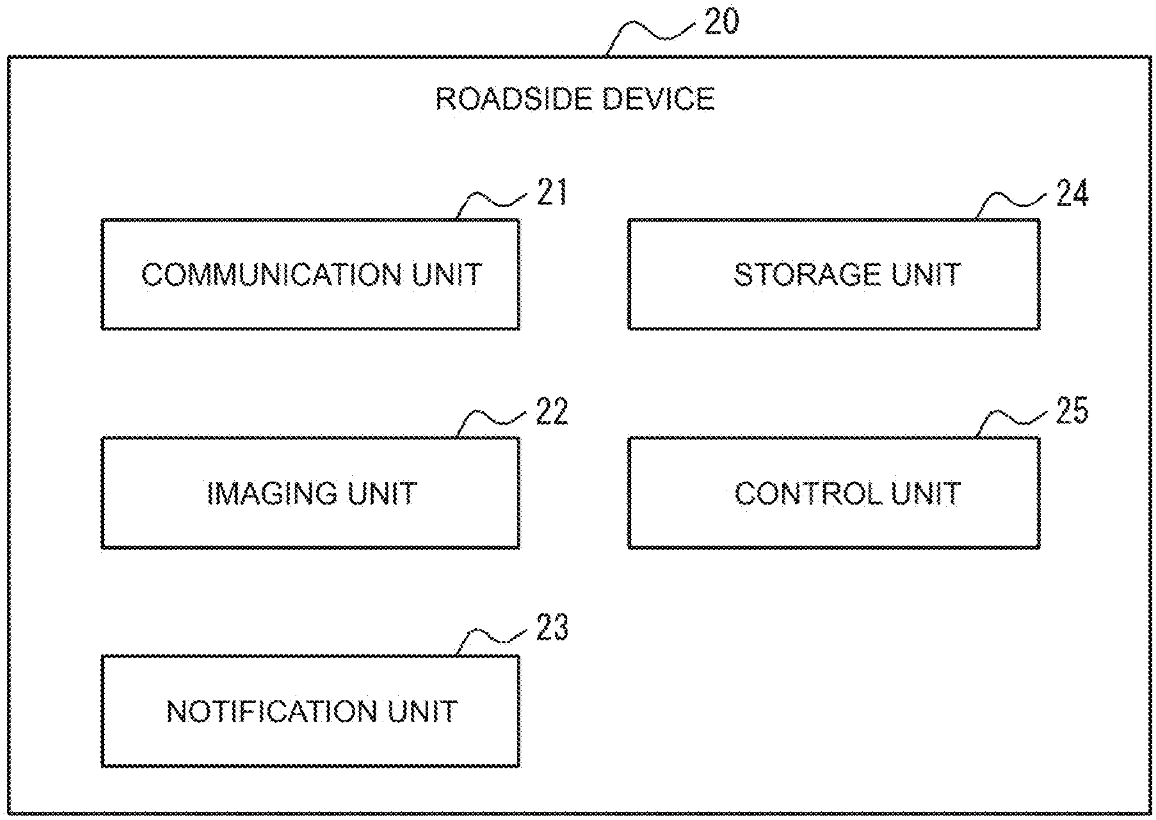
FIG. 3 is a block diagram illustrating an example of a configuration of the roadside device of FIG. 1.

FIG. 3 is a block diagram illustrating an example of a configuration of the roadside device 20 of FIG. 1. The roadside device 20 includes a communication unit 21, an imaging unit 22, a notification unit 23, a storage unit 24, and a control unit 25.

The communication unit 21 includes one or more communication interfaces connected to the network 40. The communication interface corresponds to, for example, a mobile communication standard or a radio LAN standard, but is not limited thereto, and may correspond to any other communication standard.

The imaging unit 22 includes one or more cameras capable of photographing scenery around the roadside device 20. The roadside device 20 may be installed in the vicinity of the boundary between the sidewalk and the roadway so that, for example, a pedestrian moving from the sidewalk toward the roadway can be photographed by the imaging unit 22.

The notification unit 23 includes one or more notification devices that output information to notify a nearby pedestrian or the like. The notification device includes an electronic bulletin board that visually outputs information in an image, a lamp, a display, a speaker that audibly outputs information in a sound, a vibrator that vibrates and tactilely outputs information, and the like. The notification unit 23 is not limited thereto, and may include any other notification device.

The storage unit 24 includes one or more memories. Each memory included in the storage unit 24 may function as, for example, a main storage device, an auxiliary storage device, or a cache memory. The storage unit 24 stores arbitrary information used for the operation of the roadside device 20. For example, the storage unit 24 may store a system program, an application program, embedded software, and the like. The information stored in the storage unit 24 may be updatable with, e.g., information that is acquired from the network 40 via the communication unit 21.

The control unit 25 includes one or more processors, one or more programmable circuits, one or more dedicated circuits, or a combination thereof. The control unit 25 is communicably connected to the constituent units constituting the roadside device 20, and controls the overall operation of the roadside device 20.

Figure 4:
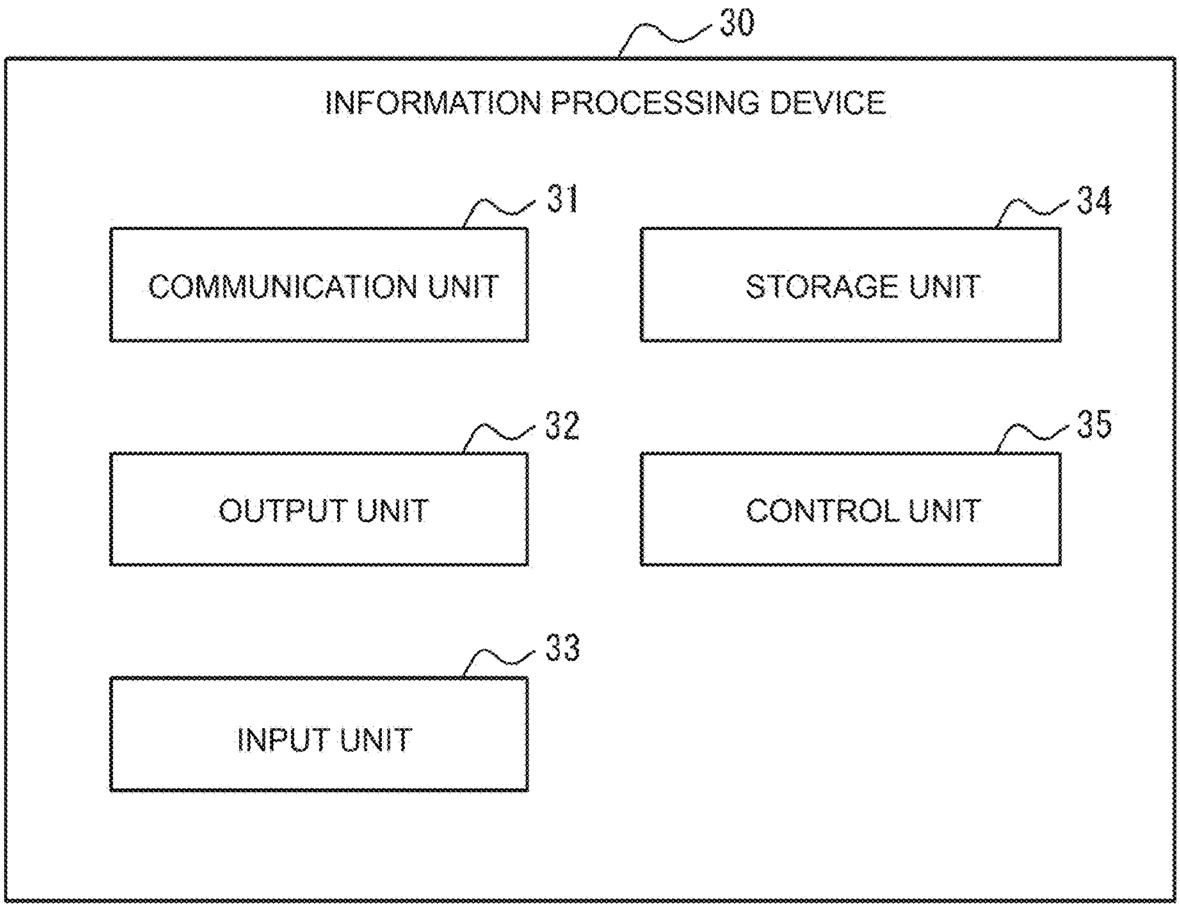
FIG. 4 is a block diagram illustrating an example of a configuration of the information processing device illustrated in FIG. 1.

FIG. 4 is a block diagram illustrating an example of a configuration of the information processing device 30 of FIG. 1. The information processing device 30 includes a communication unit 31, an output unit 32, an input unit 33, a storage unit 34, and a control unit 35.

The communication unit 31 includes one or more communication interfaces connected to the network 40. The communication interfaces correspond to, for example, a mobile communication standard, a wired LAN standard, or a radio LAN standard, but are not limited thereto, and may correspond to any other communication standard.

The output unit 32 includes one or more output devices that output information and provide the information to a user of the information processing device 30. The output device includes a display that visually outputs information in an image, a speaker that audibly outputs information in a sound, and a vibrator that vibrates and tactilely outputs information. The output unit 32 is not limited thereto, and may include any other output device.

The input unit 33 includes one or more input devices that detect a user input and acquire input information based on an operation of the user. The input device includes a physical key, a capacitive key, a pointing device such as a mouse, a touch screen integrally provided with a display of the output unit 32, an imaging module such as a camera, and a microphone that receives an audio input. The input unit 33 is not limited thereto, and may include any other input device.

The storage unit 34 includes one or more memories. Each memory included in the storage unit 34 may function as, for example, a main storage device, an auxiliary storage device, or a cache memory. The storage unit 34 stores arbitrary information used for the operation of the information processing device 30. For example, the storage unit 34 may store a system program, an application program, embedded software, and the like. The information stored in the storage unit 34 may be updatable with information received from the network 40 via the communication unit 31, for example.

The control unit 35 includes one or more processors, one or more programmable circuits, one or more dedicated circuits, or a combination thereof. The control unit 35 is communicably connected to the constituent units constituting the information processing device 30, and controls the overall operation of the information processing device 30.

Figure 5:
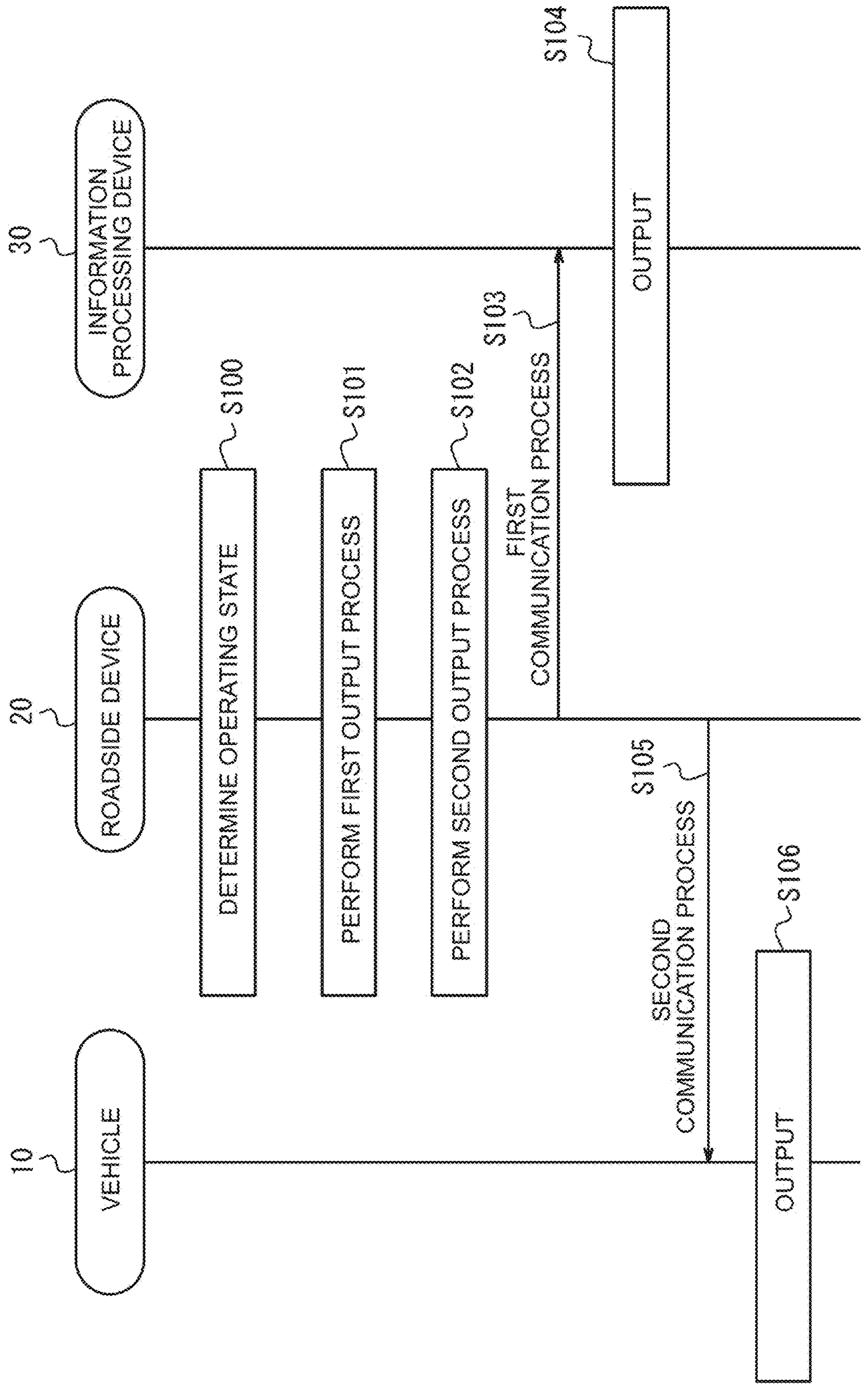
FIG. 5 is a sequence diagram for explaining an example of an information processing method performed by the information processing system of FIG. 1.

FIG. 5 is a sequence diagram for explaining an example of an information processing method performed by the information processing system 1 of FIG. 1. With reference to FIG. 5, an operation of the roadside device 20 according to an embodiment will be mainly described, and an overall operation of the information processing system 1 will be outlined.

In S100, the control unit 25 of the roadside device 20 determines the operating state of the roadside device 20. In the present disclosure, the operating state includes at least one of the following states: a stopped state, a restarting state, a running state, a battery state, a communication state, a state of a component, and a placement state. The "state of the component" includes either or both of a first state in which the component is in failure and a second state in which the component is likely to fall into the first state. The "component" includes, for example, a battery, a camera included in the imaging unit 22, a display, a speaker, a vibrator, and the like included in the notification unit 23. The control unit 25 of the roadside device 20 may determine the first state or the second state based on any conventional technique.

The control unit 25 of the roadside device 20 performs a notification process for notifying the notification target person according to the operating state determined in S100. In the present disclosure, the "notification target person" includes at least one of the following: a pedestrian around the roadside device 20, a driver and a driver assistant of the vehicle 10 traveling in the detection area of the roadside device 20, and an operator of the control center. In the present disclosure, the notification target person may also be a user of the information processing device 30. The "notification process" includes a process for notifying the notification target person of the operating state or prompting the notification target person to take necessary measures to the roadside device 20 according to the operating state. The "process" includes at least one of the following processes: a first output process, a second output process, a first communication process, and a second communication process. In the first output process, visual information is output from the notification unit 23 itself. The second output process outputs auditory information from the notification unit 23 itself. In the first communication process, the communication unit 21 is used to output either or both of the visual information and the auditory information from the information processing device 30 of the notification target person, and in the second communication process, the communication unit 21 is used to output either or both of the visual information and the auditory information from the vehicle 10.

In S101, for example, the control unit 25 of the roadside device 20 performs the first output process to the notification target person by the notification unit 23 in accordance with the operating state determined in S100.

In S102, for example, the control unit 25 of the roadside device 20 causes the notification unit 23 to execute the second output process for the notification target person according to the operating state determined in S100.

In S103, for example, the control unit 25 of the roadside device 20 performs the first communication process by the communication unit 21 in order to cause the notification target person to output either or both of the visual information and the auditory information from the information processing device 30 according to the operating state determined in S100.

In S104, the control unit 35 of the information processing device 30 outputs either or both of the visual information and the auditory information from the output unit 32 to the user of the information processing device 30 as the notification target person based on the information received from the roadside device 20 via the communication unit 31 in S103.

In S105, for example, the control unit 25 of the roadside device 20 performs the second communication process by the communication unit 21 in accordance with the operating state determined in S100. Thus, the control unit 25 causes the driver or the driver assistant of the vehicle 10 included in the notification target person to output either or both of the visual information and the auditory information from the vehicle 10.

In S106, the control unit 15 of the vehicle 10 outputs either or both of the visual information and the auditory information from the output unit 14 to the driver or the driver assistant as the notification target person, based on the information received from the roadside device 20 via the communication unit 11 in S105.

Figure 6B:
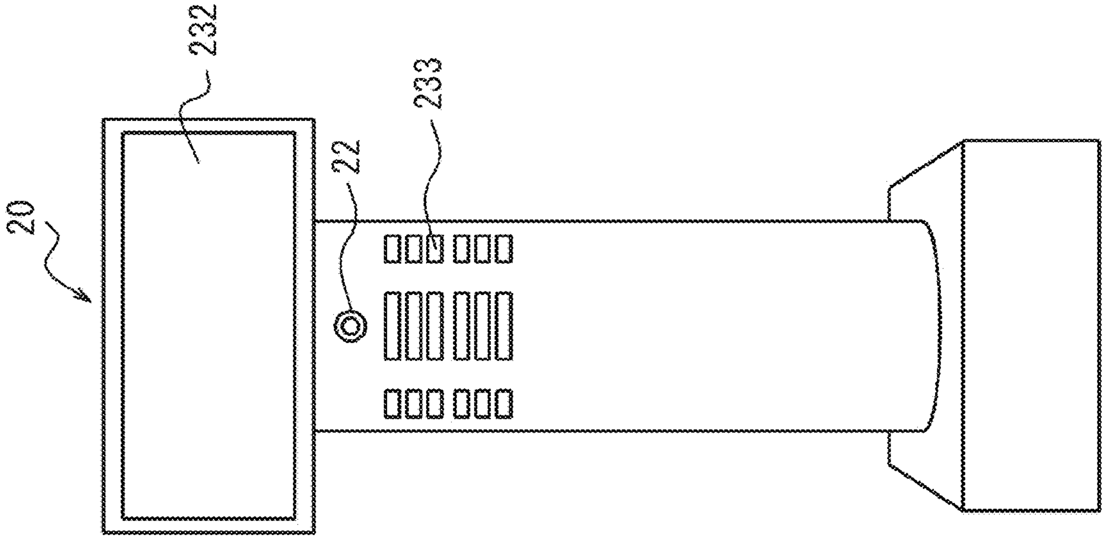
FIG. 6B is a schematic view of the appearance showing an example of the configuration of the roadside device shown in FIG. 1.
Figure 6A:
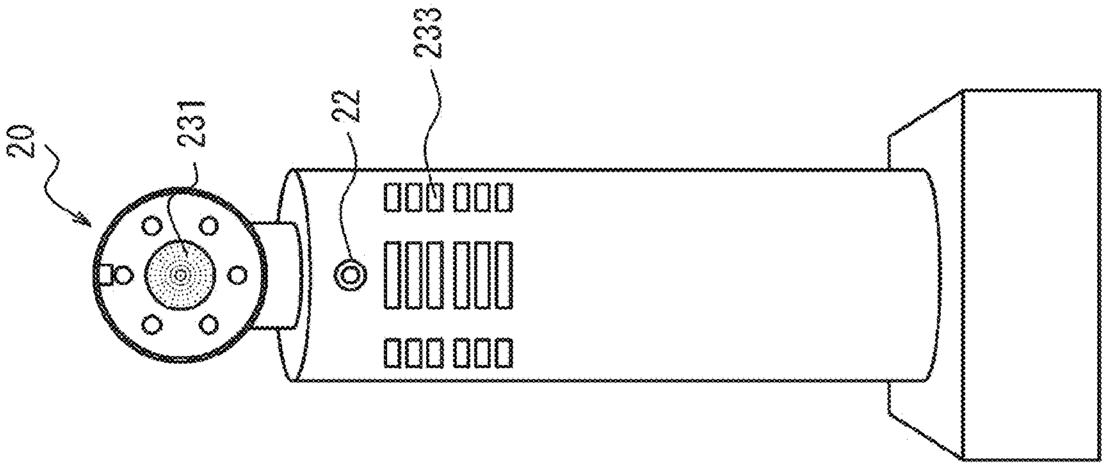
FIG. 6A is a schematic view of the appearance showing an example of the configuration of the roadside device shown in FIG. 1.

FIG. 6A and FIG. 6B are schematic external views illustrating an exemplary configuration of the roadside device 20 of FIG. 1. FIG. 6A illustrates a configuration including a lamp 231 as an exemplary notification unit 23. FIG. 6B illustrates a configuration including an electric bulletin board 232 as another exemplary notification unit 23. A specific embodiment of the operation of the roadside device 20 of FIG. 1 will be mainly described referring to FIG. 6A and FIG. 6B.

For example, consider a case where the operating state is a stopped state, a restarting state, or a running state. The control unit 25 of the roadside device 20 may execute the first output process by turning on or blinking the lamp 231 included in the notification unit 23 so that the pedestrian around the roadside device 20 can visually recognize the light. For example, the control unit 25 may turn on the lamp 231 when the roadside device 20 is in the running state. Similarly, the control unit 25 may perform the first output process by displaying text on the electric bulletin board 232 included in the notification unit 23 or displaying an image on a display. For example, the control unit 25 may execute a display process such as "system restart" when the roadside device 20 is in the restarting state.

In addition, the control unit 25 of the roadside device 20 may perform the second output process by outputting sound from the speaker 233 included in the notification unit 23 so as to be audible to a pedestrian around the roadside device 20. For example, the control unit 25 may execute an audio output process such as "restart the system" when the roadside device 20 is in the restarting state.

The control unit 25 of the roadside device 20 may execute the first communication process using the communication unit 21 for causing the information processing device 30 used by the notification target person to execute the same process as the first output process and the second output process using the notification unit 23 of the roadside device 20. For example, the control unit 25 may execute the first communication process in order to notify the notification target person of the operating state of the roadside device 20 by the output unit 32 of the information processing device 30.

The control unit 25 of the roadside device 20 may execute a second communication process using the communication unit 21 for causing the vehicle 10 on which the driver or the driver assistant is riding to execute a process similar to the first output process and the second output process using the notification unit 23 of the roadside device 20. For example, the control unit 25 may execute the second communication process in order to notify the driver or the driver assistant of the operating state of the roadside device 20 by the output unit 14 of the vehicle 10.

The same applies when the operating state is the battery state. The control unit 25 of the roadside device 20 may notify the notification target person of the fact that the remaining amount of the battery has fallen below the threshold value, the remaining amount of the battery at that time, and the like by the first output process, the second output process, the first communication process, the second communication process, and the like. In addition, the control unit 25 may notify the notification target person such as "Replace the battery", and prompt the notification target person to take necessary measures to the roadside device 20 according to the operating state of the roadside device 20.

The same applies when the operating state is the communication state. The control unit 25 of the roadside device 20 may notify the notification target person of the occurrence of a communication failure or the like by the first output process, the second output process, the first communication process, the second communication process, or the like. In addition, the control unit 25 may notify the notification target person such as "Please recover the communication failure", and prompt the notification target person to take necessary measures to the roadside device 20 according to the operating state of the roadside device 20.

The same applies to the case where the operating state is the operating state of the component. The control unit 25 of the roadside device 20 may notify the notification target person by the first output process, the second output process, the first communication process, the second communication process, and the like that the component has failed and that there is a high possibility that the component fails and the component cannot operate normally. For example, the control unit 25 may determine that the camera of the imaging unit 22 has failed when the feature point with respect to the reference image is completely different or the image is dark. In addition, the control unit 25 may notify the notification target person such as "Replace the part", and prompt the notification target person to take necessary measures to the roadside device 20 according to the operating state of the roadside device 20.

The same applies to the case where the operating state is the placement state of the roadside device 20. The control unit 25 of the roadside device 20 may notify the notification target person by the first output process, the second output process, the first communication process, the second communication process, and the like that the arrangement of the roadside device 20 is deviated from the reference arrangement within the threshold. For example, the control unit 25 may determine a deviation of the arrangement of the roadside device 20 itself from image information or the like from the camera of the imaging unit 22. For example, the control unit 25 may determine the displacement of the roadside device 20 based on GPS from the sensor built in the roadside device 20.

In addition, the control unit 25 may notify the notification target person such as "return to the reference arrangement", and prompt the notification target person to take necessary measures to the roadside device 20 according to the operating state of the roadside device 20. In addition, the control unit 25 may notify the notification target person such as "the disposition of the roadside device 20 is deviated beyond the threshold value, and the correction work to the reference disposition by the administrator of the roadside device 20 is necessary". Accordingly, the control unit 25 prompts the notification target person to take necessary measures to the roadside device 20 in accordance with the operating state of the roadside device 20.

The control unit 25 of the roadside device 20 may determine the presence or absence of the pedestrian and the vehicle 10 in the vicinity of the roadside device 20 based on an image from the camera of the imaging unit 22. When determining that neither the pedestrian nor the vehicle 10 is present around the roadside device 20, the control unit 25 may not execute the notification process. The control unit 25 may execute the notification processing only when the pedestrian, the vehicle 10, and the like are detected by the image recognition based on the image from the camera of the imaging unit 22.

According to the roadside device 20 according to the embodiment as described above, the technology related to the roadside device 20 that can be used for monitoring the vehicle 10 having the communication function is improved. The roadside device 20 can determine the operating state of the roadside device 20 itself and execute appropriate notification processing according to the operating state. The roadside device 20 can also appropriately determine the specific method of the notification process and the notification target person according to the operating state of the roadside device 20. The notification target person who has received the notification based on the notification process related to the operating state of the roadside device 20 can accurately determine the operating state of the roadside device 20 or take necessary measures to the roadside device 20 according to the operating state.

Although the present disclosure has been described above based on the drawings and the embodiment, it should be noted that those skilled in the art can make various modifications and alterations thereto based on the present disclosure. It should be noted, therefore, that these modifications and alterations are within the scope of the present disclosure. For example, the functions, etc. included in the configurations, steps, or the like can be rearranged so as not to be logically inconsistent, and a plurality of configurations, steps, or the like can be combined into one or divided.

For example, a general-purpose electronic device such as a smartphone or a computer can be configured to function as the roadside device 20 according to the above-described embodiment. Specifically, a program describing processing contents for realizing each function of the roadside device 20 and the like according to an embodiment is stored in a memory of an electronic device, and the program is read and executed by a processor of the electronic device. Accordingly, the present disclosure can also be implemented as a program that can be executed by a processor.

Alternatively, the present disclosure may also be implemented as a non-transitory computer-readable medium storing a program executable by one or more processors to cause the roadside device 20 or the like according to an embodiment to execute each function. It should be understood that the above configurations are also included in the scope of the present disclosure.

For example, at least part of the processing operations performed in the roadside device 20 in the above embodiment may be performed in either or both of the vehicle 10 and the information processing device 30. At least part of the processing operations performed in each of the vehicle 10 and the information processing device 30 may be performed in the roadside device 20.

In the above-described embodiment, the roadside device 20 may be used to provide Mobility as a Service (MaaS), which is a service that uses mobility. The above process sequence illustrated in the sequence diagram illustrated in FIG. 5 may be performed when providing a service (MaaS) that uses the roadside device 20. In this case, the information processing method according to the above-described processing procedure is an exemplary method of providing a service (MaaS) that uses the roadside device 20.

What is claimed is:

1. A roadside device comprising:

a camera configured to capture an image of a surrounding environment;

a sensor configured to acquire GPS information;

a battery;

a notification unit including at least one of an electronic bulletin board, a liquid crystal display, a speaker, and a lamp;

a communication unit including a communication interface; and a control unit configured to determine a failure state of the roadside device, and cause the notification unit to notify a notification target person of the determined failure state according to the determined failure state of the roadside device, wherein:

the failure state includes at least one of a stopped state, a restarting state, a low battery state, a communication failure state, a component failure state, and a displaced state;

the stopped state is a state in which the roadside device has ceased to operate;

the restarting state is a state in which the roadside device is being restarted;

the low battery state is a state in which a remaining amount of charge of the battery has fallen below a predetermined threshold value;

the communication failure state is a state in which a communication failure between the roadside device and an information processing device occurs or a state in which a communication failure between the roadside device and a vehicle occurs;

the component failure state is a state in which a component of the roadside device has failed; and the displaced state is a state in which an arrangement of the roadside device is displaced from a reference position.

2. The roadside device according to claim 1, wherein the control unit is configured to cause the notification unit to further notify the notification target person of the failure state or notify information prompting the notification target person to take a necessary action for the roadside device according to the failure state.

3. The roadside device according to claim 2, wherein the notification unit is configured to output at least one of:

visual information; and auditory information.

4. The roadside device according to claim 3, wherein the control unit is further configured to, in the restarting state, cause at least one of:

the electronic bulletin board to display text to restart a system of the roadside device;

the liquid crystal display to display an image indicating that the system is restarting; and the speaker to output a sound indicating that the system is restarting.

5. The roadside device according to claim 3, wherein the control unit is further configured to turn on or blink the lamp to notify the notification target person of the determined failure state.

6. A method for providing mobility-as-a-service that uses the roadside device according to claim 1.

7. The roadside device according to claim 1, wherein the control unit is further configured to determine, as the component failure state, that the camera, as the component, has failed in a case where a feature point with respect to a reference image is different from a position of a feature point in a current image.

8. The roadside device according to claim 7, wherein the control unit is configured to cause the notification unit to further notify the notification target person of an instruction to replace the camera, as the component, in a case where the control unit determines that the camera has failed.

9. The roadside device according to claim 1, wherein the control unit is further configured to determine, as the displaced state, whether a position of the roadside device has been displaced more than a predetermined threshold range from the reference position based on the image captured by the camera or the GPS information acquired by the sensor.

10. The roadside device according to claim 9, wherein the control unit is further configured to cause the notification unit to notify the notification target person of an instruction to return the roadside device to the reference position in a case where the control unit determines that the position of the roadside device is displaced from the reference position.

11. The roadside device according to claim 1, wherein the control unit is configured to cause the notification unit to notify the notification target person that the failure state is the low battery state in a case where the failure state is the low battery state.

12. The roadside device according to claim 1, wherein the control unit is configured to cause the notification unit to further notify the notification target person of an instruction to replace the battery in the low battery state.

13. The roadside device according to claim 1, wherein the control unit is configured to, in the communication failure state, cause at least one of:

the notification unit to further notify the notification target person that the communication failure between the roadside device and the information processing device has occurred; and the notification unit to further notify the notification target person that the communication failure between the roadside device and a vehicle has occurred.

14. The roadside device according to claim 1, wherein the control unit is configured to, in the communication failure state, cause at least one of:

the notification unit to further notify the notification target person of an instruction to recover from the communication failure between the roadside device and the information processing device; and the notification unit to further notify the notification target person of an instruction to recover from the communication failure between the roadside device and the vehicle.

15. The roadside device according to claim 1, wherein the control unit is further configured to cause at least one of:

the communication unit to transmit, to the information processing device of the notification target person, an instruction for causing the information processing device to output either or both visual information and auditory information indicating the determined failure state; and the communication unit to transmit, to a vehicle, an instruction for causing the vehicle to output either or both the visual information and the auditory information.

16. The roadside device according to claim 1, wherein the stopped state is a state in which the roadside device is stopped.

* * * * *